(12) United States Patent
Loecker

(10) Patent No.: US 8,166,793 B2
(45) Date of Patent: May 1, 2012

(54) METHOD AND DEVICE FOR THE TECHNIQUE OF COLD MICROFORGING ANY FREELY FORMED 3-D SURFACES

(76) Inventor: Christian Loecker, Lippetal-Herzfeld (DE)

( * ) Notice: Subject to any disclaimer, the term of this patent is extended or adjusted under 35 U.S.C. 154(b) by 1103 days.

(21) Appl. No.: 11/996,756

(22) PCT Filed: Aug. 9, 2006

(86) PCT No.: PCT/DE2006/001393
§ 371 (c)(1),
(2), (4) Date: Jan. 25, 2008

(87) PCT Pub. No.: WO2007/016919
PCT Pub. Date: Feb. 15, 2007

(65) Prior Publication Data
US 2008/0308199 A1    Dec. 18, 2008

(30) Foreign Application Priority Data
Aug. 9, 2005  (DE) .......................... 10 2005 037 544

(51) Int. Cl.
*B21J 15/24*        (2006.01)
(52) U.S. Cl. ........................................................ 72/430
(58) Field of Classification Search ............... 72/430; 29/90.01, 559; 700/245; 173/117; 83/575, 83/577
See application file for complete search history.

(56) References Cited

U.S. PATENT DOCUMENTS

| | | | |
|---|---|---|---|
| 4,641,510 A | | 2/1987 | Mitsching et al. |
| 4,821,614 A | * | 4/1989 | Fleet et al. ................ 83/575 |
| 5,090,284 A | * | 2/1992 | Nakajima ................. 83/577 |
| 6,484,613 B1 | * | 11/2002 | Lee et al. ................. 83/575 |
| 2001/0043133 A1 | | 11/2001 | Takanashi et al. |
| 2003/0213280 A1 | | 11/2003 | Easterbrook et al. |

FOREIGN PATENT DOCUMENTS

| | | |
|---|---|---|
| DE | 10243415 | 4/2004 |
| GB | 712334 | 7/1954 |

* cited by examiner

*Primary Examiner* — Teresa Ekiert
(74) *Attorney, Agent, or Firm* — Schmeiser, Olsen & Watts, LLP

(57) ABSTRACT

An electromechanical knocking activated device and method for working and cold-hardening the surface of tools, machine parts, etc. is disclosed. The electromechanical apparatus may include: an impact head which is secured to a support, wherein at least one part of the support is composed of a ferromagnetic material; and at least one coil which is also secured to the support. A magnetic field holds the impact head in a defined position of rest. The coil is may be positioned in the same magnetic field or a second magnetic field, through which an alternating or pulsed current may flow. As a result, the impact head is made to oscillate with a defined impact frequency, impact altitude and zero crossing. The device may be used in combination with a computer aided manufacturing system.

10 Claims, 1 Drawing Sheet

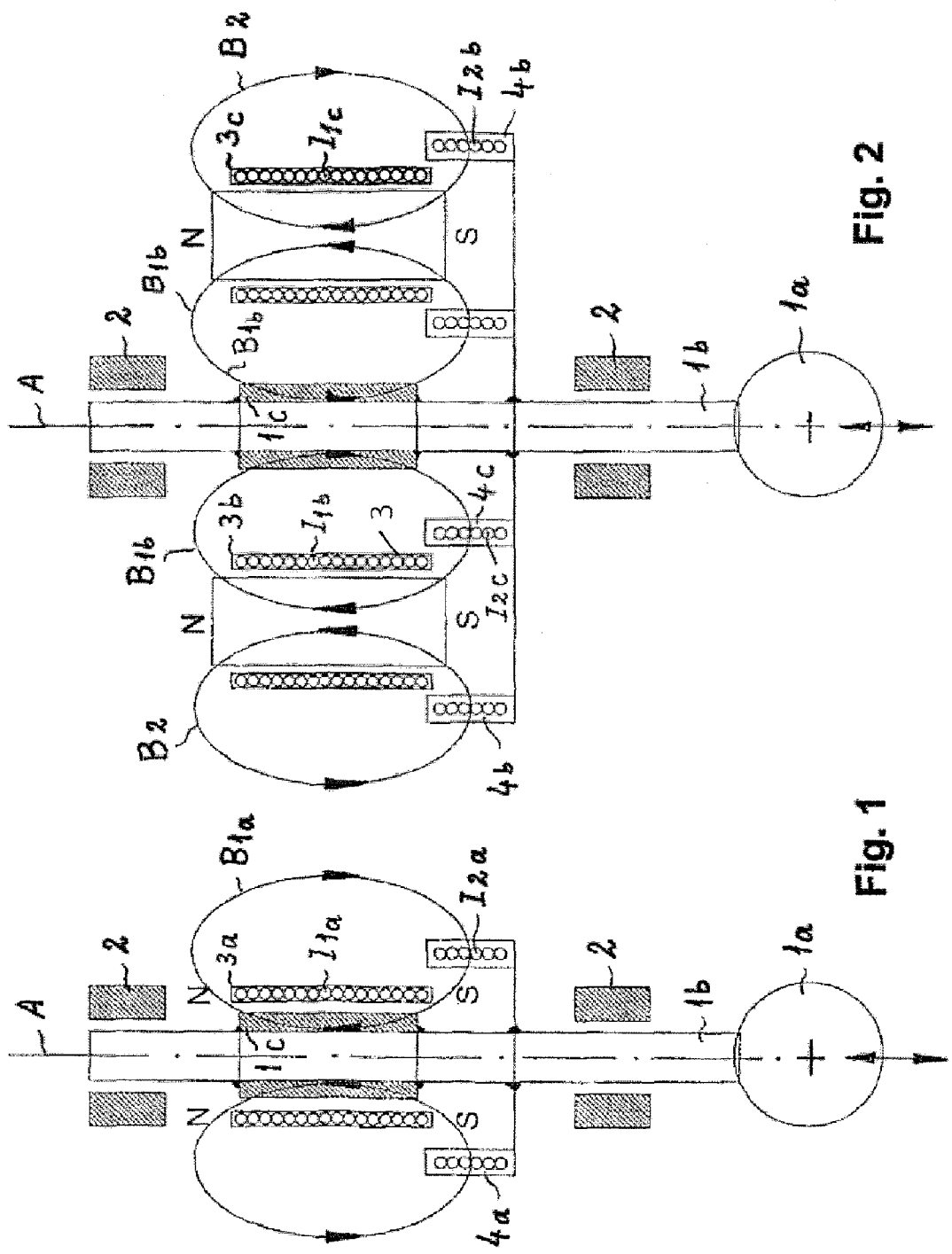

METHOD AND DEVICE FOR THE TECHNIQUE OF COLD MICROFORGING ANY FREELY FORMED 3-D SURFACES

BACKGROUND

The invention relates to an electromechanical knocking device and knocking method for smoothing and cold-hardening the surface of tools, machine parts and other parts by hammering on the surface of said parts for mounting them on a machine tool or a robot. A device of this kind is shown by laid-open patent application no. DE 197 32 790.7-14. In said device, a slide is moved axially with a constant amplitude by the rotation of a disc, which is embodied with undulations in the circumferential direction, on a non-rotating second disc which is embodied with undulations in the opposite direction. A spherical head which impacts on the workpiece surface is located at the workpiece end of the slide.

In practice, this device has substantial disadvantages. The impact movements are produced in a mechanically interlocking manner. As a result, the device is subjected to the enormous abrasion of the cam disc or undulating disc. The head strikes the workpiece surface with a constant amplitude, irrespective of the position, shape and stiffness or hardness of the surface. This limits the use of said device to a few cases.

The laid-open patent application no. DE 102 43 415 A1 describes a similar device in which the head is moved by converting ultrasound into a mechanical movement. However, this laid-open patent application does not disclose the manner in which the ultrasound is converted into movement of the impacting head, and does not refer with a single word to the amplitude of the impact.

SUMMARY

In contrast, the problem addressed by the present invention is to smooth and harden the surfaces of tools, workpieces and machine parts, with a minimum of wear, abrasion and energy input, by variably adapting the impact frequency and impact amplitude, and by variably adapting the zero position or zero crossing of the impact frequency to the local shape, wall thickness and hardness of the parts.

Due to the magnetic suspension of the impact head with a variable yet defined resting position, combined with the electrical and electronic control and regulation of the impact frequency and amplitude depending on material-related and geometrical parameters, the optimal impact frequency and amplitude as well as the resting position of the impact head is determined and set for each position on a workpiece surface, according to the invention, in such a way that the best result is achieved within a very short time with a minimum of energy input.

BRIEF DESCRIPTION

The figures show:

FIG. 1 the cross-section through the device of the invention, with a coil attached to the housing as a holding magnet and an axially displaceable excitation coil of the impact head, FIG. 2 the cross-section through the device of the invention, with a permanent-magnet ring attached to the housing, or a plurality of smaller permanent magnets or coils arranged in annular form as a holding magnet around the support for the impact head, and one or two axially displaceable excitation coils of the impact head.

DETAILED DESCRIPTION

In the most simple embodiment, a device according to the invention has an impact head that is usually spherical and which consists of a very hard material. The impact head is replaceably disposed on a support. It can thus be replaced by a different head, for example a punch-shaped head, in order to produce textured surfaces.

At least one part of the support for the impact head is magnetically conductive and is held in a preferred resting position by an annular tubular magnetic flux. It is laterally guided and held by radial bearings or magnetic bearings or other types of bearings, so that it can perform axial deflections from its resting position. This first magnetic flux is generated either by an axially magnetised permanent-magnet ring which for its part coaxially surrounds the magnetic part of the impact head support in an axially adjustable manner, or is generated by a cylindrical coil through which regulated current flows and which is disposed coaxially around the magnetic part of the support for the impact head. In the latter case, the coil may consist of a plurality of part-windings which are switched in series, in parallel or counter to each other depending on the required magnetic field strength and resting position of the impact head, and through which current flows.

Excited by the flow of a regulated and/or pulsed current, with or without a direct current component, through a second coil that is located in the same magnetic field or in a second branch, for example an outer flux, of the same magnetic field, said coil being attached to the support for the impact head and coaxially disposed in relation thereto, the impact head is made to oscillate axially with a defined frequency and amplitude in such a way that the middle position or zero crossing of the impact oscillations can be regulated at will. By this means, the impact frequency, impact amplitude and the middle position or zero crossing of the impact oscillations can be adapted to the geometrical relations and mechanical properties of the workpiece.

In another advantageous configuration of the invention, the permanent-magnet ring is replaced with a plurality of smaller cylindrical permanent magnets arranged parallel to each other on a cylinder around the magnetic part of the impact head support. Analogously, the small permanent magnets can each be replaced by coils through which direct current flows. This constellation of the permanent magnets or the coils results in two different magnetic fluxes, namely an inner and an outer flux. The inner magnetic flux ensures that the support for the impact head adopts a defined position. In this case, the windings of the excitation coil may be located in the inner magnetic flux, in the outer magnetic flux or in both magnetic fluxes. In the latter case, the windings of the two coils are wound in opposite directions, because the magnetic fluxes are oriented in opposite directions.

A device designed in such a manner can work, hammer, smooth and cold-harden the surfaces of tools in partially different ways. By means of program-controlled and electronic adjustment of the distance between the middle of the impact oscillation and the surface of the workpiece, the efficiency of the device is optimised and the power loss therefore minimised. For example, the edges are worked with a higher frequency and a smaller amplitude in order to preserve the shape and design of the part and so as not to constrict the bore openings. One more advantageous use of the device according to the invention involves combining this electromechanical device with a specially developed analytical CAM system to provide a new method.

Commercially available CAM systems always work the surface of a workpiece by guiding the tool parallel to the desired surface of the workpiece, using a so called "offset method". The method according to the invention, in contrast, works with an analytical CAM system. After analysis of the desired 3-D surface using the geometric data, the smallest radius of curvature of the surface is determined and specified as the largest ball radius of the tool. After selecting the tool radius, the CAM system of the invention calculates the path traversed by the centre of the spherical milling cutter and knocking tool, by allowing a ball of the same radius to roll over the entire desired surface and determining the geometrical position of the ball's centre as the new 3-D surface for guiding the tool centre. The curvatures of the new 3-D surface are then calculated and analysed, after which the optimal guide paths of the tool's centre are determined in such a way that grooving during milling and bulging during knocking are minimised.

The analytical CAM system according to the invention therefore knows at any time the momentary position at which the tool contacts the surface of the workpiece, and can respond accordingly. Flat paths are worked with a different strategy than paths which are more strongly curved, or than corners of borings, recesses, grooves or workpiece edges. The combination and electronic coupling of the device of the invention with the analytical CAM system described in the foregoing, with or without inclusion of a mechanical or contactless surface measurement process, such as laser measurement of the workpiece surfaces during machining, results in an intelligent and autonomous milling and knocking method as required in control engineering. The desired 3-D surface shapes, dimensional and positional tolerances, as well as the partial surface roughnesses and material strengths are taken over from the drawing program and automatically executed by this intelligent system.

This intelligent system recognises all edges and other critical points, such as thinner walls of the workpiece, and treats these with appropriate care.

Since the actual momentary point of contact between the knocking tool and the workpiece is known, the longitudinal axis of the device is always oriented and guided as a normal to the surface tangent plane at the point of contact with the workpiece. This results in optimised knocking and in the best currently achievable results being obtained.

Identical parts are marked with the same numbers or the same letters. Different indices denote different regions or different embodiments or multiple arrangements of the same part. According to FIG. 1, an impact head (1a) is replaceably fixed to a light, non-magnetic support (1b). The support (1b) is radially mounted in the housing (2) so that it can perform only axial movements in the direction of its longitudinal axis (A). The housing (2) is fixed by a corresponding receiver to a machine tool, such as a milling machine or a robot or a hexapod. The support for the impact head (1b) may be hollow throughout so that cables, measuring probes or light beams can be guided through its hollow centre. A ferromagnetic collar (1c), which in a magnetic field (B1) adopts a particular position as its resting position, is fixed coaxially to the support (1b).

A centrally positioned coil (3a) fixed to the housing (2) and through which direct current (I1a) flows is coaxially disposed around the collar (1c) in order to produce a magnetic field (B1a). The coil (3a) may consist of a single coil or of a plurality of smaller coils which, depending on requirements, may be switched electronically in parallel or in series or in combination, in order to change the holding force and the resting position of the impact head. The coil (3a) may also be designed to be mechanically displaceable in the axial direction, in order to change the resting position of the impact head manually or electromotively or electromagnetically.

At the support for the impact head (1b) there is a second coil (4a) of such a kind that its wire windings run perpendicular to the field lines of the magnetic field (B1a). An alternating current (I2a) and/or a pulsed current (I2a) with or without a direct current component, with a controlled frequency and amplitude flows through the coil (4a). This causes the impact head to move up and down with a defined frequency and amplitude. The impact frequency is determined by the pulse frequency, and the impact force by the pulse amplitude and pulse width.

In FIG. 2, the mechanical structure of the device is essentially similar to that in FIG. 1, but with the different that the magnetic field (B1a) is generated either by an axially magnetised permanent-magnet ring (3) or by a plurality of smaller cylindrical permanent magnets which are disposed coaxially around the collar (1c) and which can also be replaced by single coils (3b, 3c, ... ). This arrangement of the permanent-magnet ring or the permanent magnets or the coils results in two annular tubular magnetic fluxes, namely an inner magnetic flux (B1b) and an outer magnetic flux (B2). In combination with the collar (1c), the inner magnetic flux (B1b) ensures that the impact head returns to its resting position, whereas the coil (4b) carrying the alternating current or the pulsed current (I2b) is located in the outer magnetic flux (B2) and causes the up-and-down movement of the impact head.

In this arrangement of the magnetic fields (B1b, B2), an additional excitation coil (4c) located on the support (1b) for the impact head can be placed in the inner magnetic field (B1b). However, its direction of current flow (I2c) runs counter to the direction of current flow (I2b) in the first excitation coil (4b), due to the magnetic fields having different directions.

The features disclosed in the foregoing description, in the drawings and in the following claims may be material, both separately and in any combination thereof, for realising the invention. All the disclosed features are relevant to the invention.

The claims are as follows:

1. An electromechanical device for working, smoothing and cold-hardening a surface of one or more parts, the device comprising:
    an impact head, the impact head kept in a resting position without an excitation current (I2) by a first magnetic flux (B1), wherein an impact frequency and an impact amplitude are produced in such a variable manner by a flow of at least one of an alternating and pulsed excitation current (I2), with or without a variable direct current component, through one or more windings of at least one coil (4) placed within at least one of the first magnetic flux (B1) and a different second magnetic flux (B2);
    wherein a distance of a zero crossing of the impact frequency from the surface of the one or more parts is changed by the excitation current (I2).

2. The device of claim 1, characterised in that
the first magnetic flux and the second magnetic flux (B1, B2) are produced by at least one of an axially magnetised ring (3) and a plurality of cylindrical permanent magnets, disposed on a hollow cylinder.

3. The device of claim 1, characterised in that
a first magnetic field (B1a) is produced by a coil (3a) and a second magnetic field (B1b) are produced by a plurality of coils (3b, 3c, ... ) arranged coaxially to axis A, wherein each coil may itself consist of a plurality of coils that can be electronically switched in parallel and/or in series.

4. The device of claim 1, characterised in that
a knocking device is managed at a machine tool or a robot by an analytical CAM system.

5. The device of claim 4, characterised in that the knocking device and a magnetic holding force of the impact head and the excitation current and an excitation frequency of a plurality of impact oscillations is coupled to an analytical CAM system and controlled or regulated by the latter on a basis of the geometrical data.

6. The device of claim 1, wherein the parts include tools, machine parts, and other parts.

7. A method comprising:
replaceably disposing an impact head on a support, wherein at least one part of the support for the impact head is magnetically conductive and is held in a resting position by an annular tubular magnetic flux;
generating a first magnetic field by a first cylindrical coil through which regulated current flows and which is disposed coaxially around a magnetic part of the support for the impact head; and
generating an excitation current through a second coil which is located within at least one of the first magnetic field and a second magnetic field;
wherein the impact head oscillates axially with a defined frequency and an amplitude in such a way that a middle position of a plurality of impact head oscillations are regulated adapt to a geometrical relation and a mechanical property of a workpiece.

8. The method of claim 7, wherein the first coil includes a plurality of part-windings which are switched in at least one of series, parallel and counter to each other depending on a required magnetic field strength and the resting position of the impact head, and through which current flows.

9. The method of claim 7, further comprising:
providing a knocking device at a machine tool or a robot by an analytical CAM system.

10. The method of claim 7, wherein the knocking device and a magnetic holding force of the impact head and the excitation current and an excitation frequency of the plurality of impact head oscillations is coupled to an analytical CAM system and controlled or regulated by the latter on a basis of the geometrical data.

* * * * *